M. M. HERMAN.
DEMOUNTABLE RIM TOOL.
APPLICATION FILED APR. 22, 1914.
1,133,139.
Patented Mar. 23, 1915.
2 SHEETS—SHEET 2.
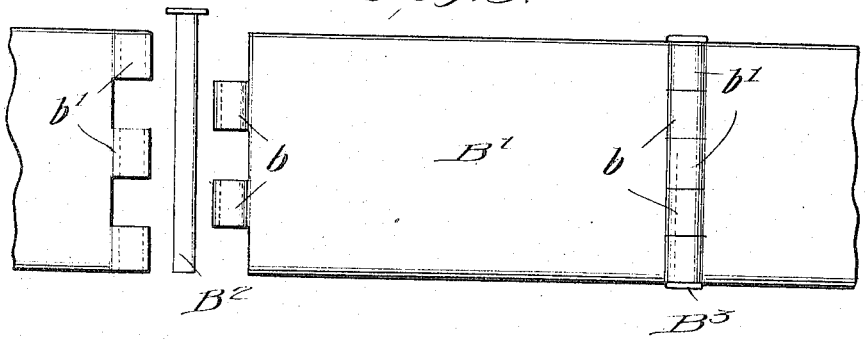
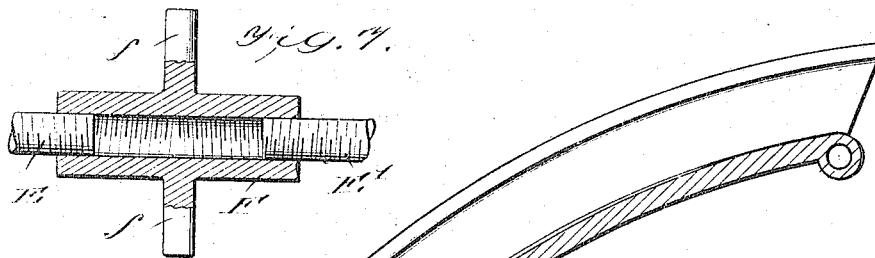
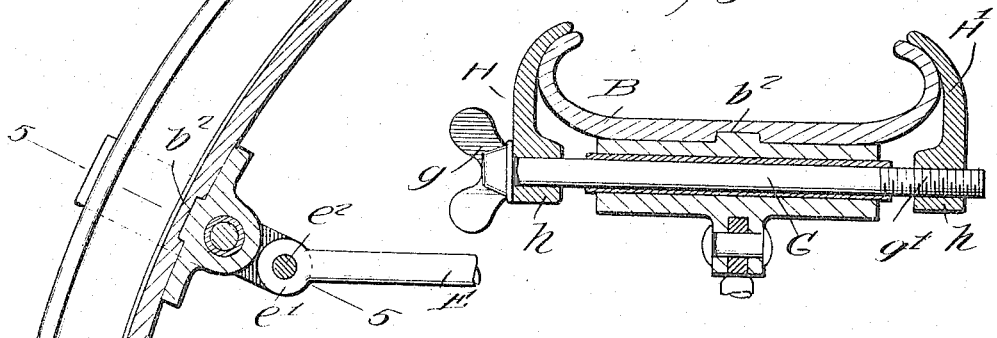
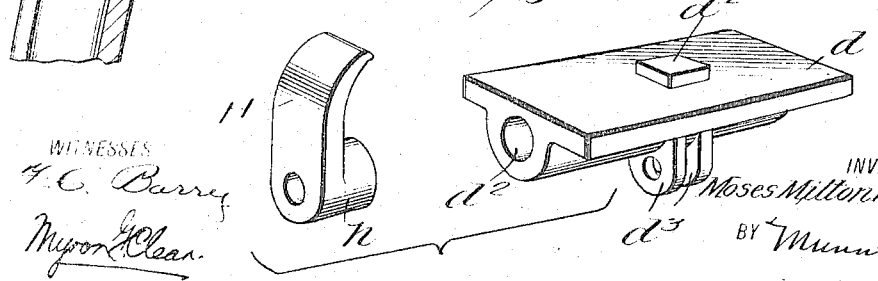
WITNESSES
INVENTOR
Moses Milton Herman
BY
ATTORNEYS

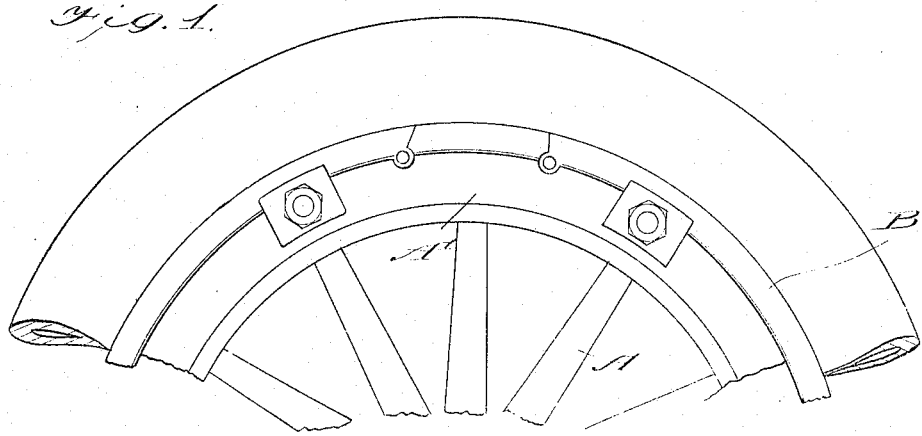
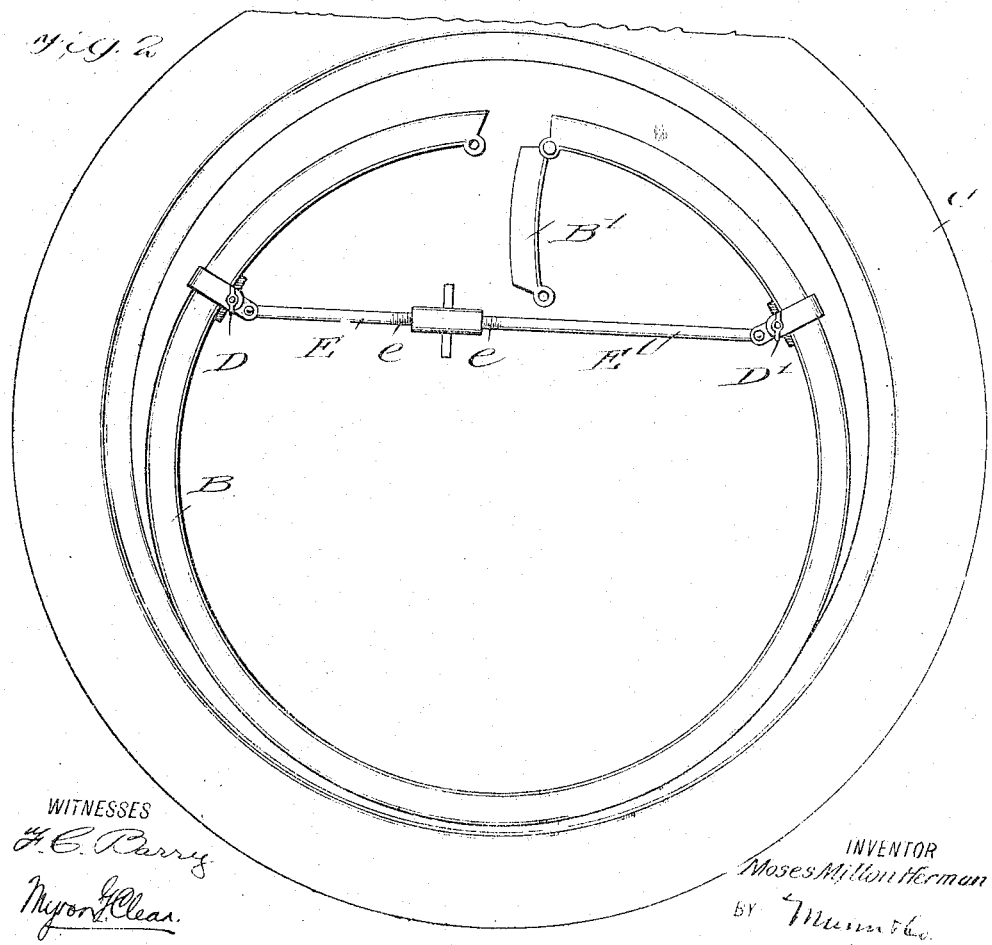

UNITED STATES PATENT OFFICE.

MOSES MILTON HERMAN, OF DANVILLE, VIRGINIA.

DEMOUNTABLE-RIM TOOL.

1,133,139.    Specification of Letters Patent.    Patented Mar. 23, 1915.

Application filed April 22, 1914. Serial No. 833,678.

*To all whom it may concern:*

Be it known that I, MOSES M. HERMAN, a citizen of the United States, and a resident of Danville, in the county of Pittsylvania and State of Virginia, have invented an Improvement in Demountable-Rim Tools, of which the following is a specification.

My present invention relates to tools for use in connection with demountable rims for motor vehicles and the like, and more particularly to a simple and inexpensive tool attached to, and detachable from, a rim to provide for its detachment from a tire disposed thereon, irrespective of the manner and means by which the rim is or may be demountably secured upon the wheel.

My invention contemplates the provision of a rim including a structure adapted to permit the rim to be reduced in circumference and readily removed from within the tire supported thereby, and of simple and inexpensive means for so reducing the circumference of the rim, which means are adapted for detachable engagement with portions of the rim and may be normally carried in the tool box of the vehicle, in connection with which the demountable rim is used, and applied with equal facility to each of the demountable rims thereof.

With the above in mind my invention may be better understood from the following description in which reference is made to the accompanying drawings, forming a part of this specification, and in which—

Figure 1 is a side elevation of the upper portion of a wheel equipped with my improved rim. Fig. 2 is a side elevation of the tire with its rim constructed in accordance with my invention, the latter being drawn inwardly to reduce its circumference and to position for removal from the tire. Fig. 3 is a plan view of a portion of the rim immediately adjacent to and including its hinged section. Fig. 4 is a sectional view taken on a median line through a portion of the rim and one of the engaging clamps engaged therewith. Fig. 5 is a detail transverse section taken therethrough substantially on line 5—5 of Fig. 4. Fig. 6 is a perspective view of the body plate and one lug of one of the clamping members, and Fig. 7 is a detail sectional view taken through the turn-buckle sleeve in normal position.

Referring now to these figures, I have shown a conventional vehicle wheel at A in Fig. 1, upon the felly A' of which my improved rim B may be demountably secured in any well known manner. The rim B is in accordance with my invention formed for the major part of a single piece of spring metal, its remaining part being in the form of a hinged section B' having its opposite ends similarly formed with extending bearings $b$ for coöperation with similar extending bearings $b'$ of the ends of the main body of the rim, in order to receive hinge pins $B^2$ and $B^3$, the latter of which is permanently held and the former of which may be removed in order that the hinged section of the rim may be dropped as best shown in Fig. 2.

With the hinged section dropped as just described it still remains necessary to draw the end portions of the body of the rim inwardly toward one another and thus reduce the rim in circumference sufficiently to enable its removal from within the tire C normally held thereon. To accomplish this operation I provide the body of the rim with recesses $b^2$ in its inner peripheral face and at similar distances from its ends in order to promote effective engagement of clamping members D and D' to which are hinged the outer ends of rods E and E' having their inner adjacent ends threaded at $e$ for engagement within the ends of an internally threaded turn-buckle tube F, this tube being provided with diametrically projecting intermediate arms $f$ by which it may be turned to draw the clamping members D and D' toward one another or force them apart either with or without the application of an additional tool.

Each of the clamps above mentioned, of which the clamp D is shown in detail in Figs. 4, 5 and 6, consists of a body plate $d$ adapted to be disposed in its length transversely against the inner peripheral face of the rim B and having a central projection $d'$ upon one face to interfit the rim recess $b^2$ and having a longitudinal bearing $d^2$ upon its opposite face centrally from which project spaced apertured ears $d^3$. A clamping bolt G extends through the bearing $d^2$ and has a winged head $g$ at one end and a threaded opposite end $g'$ projecting beyond the relatively opposite end of the plate $d$, a pair of inwardly curved clamping lugs H and H' having bearings $h$ being disposed upon the projecting ends of the clamping bolt G and the bearing of the lug H' being internally threaded for engagement with the threaded portion $g'$ of the bolt. Thus when the bolt is turned in the proper direction the clamping lugs will be drawn toward one another to engage the opposite curved sides of the rim B.

As will be seen by reference to Figs. 4 and 5 in particular and in connection with Fig. 2, the outer extremities of the rods E and E' are flattened and apertured at $e'$ and disposed between the projecting ears $d^3$ before mentioned, pins $e^2$ being extended through the apertures in the ears and rod ends in order to form hinged connections and enable proper movements of the rods with respect to the clamps as the rim is being drawn inwardly and let out. Thus it will be seen that I provide an arrangement in which the demountable rim is, in appearance, strength and durability, fully the equal of a one piece rim in operation, with means for reducing the circumference of the rim when its hinged section is let down, which means may be ordinarily carried in the tool box of the vehicle and may be applied with equal facility when necessary in connection with any or all of the wheels thereof.

I claim:

1. A rim tool of the character described, comprising clamping members for engagement with relatively opposite portions of the rim body and each including a body plate, a clamping bolt journaled through the body plate and opposing clamping lugs mounted on and adjustable by means of the said clamping bolt, adjusting rods hingedly connected at their outer ends to the said clamping members, and a turn-buckle threadedly engaging the inner adjacent ends of the adjusting rods, all substantially as described.

2. A rim tool of the character described, comprising a pair of clamping members each of said members having means for detachable engagement with both side edges of a rim and also having means whereby to positively engage portions of the inner periphery of the rim to prevent the clamping members from slipping along the rim, and adjustable connections between the said clamping members.

3. A rim tool of the character described, comprising a pair of clamping members having body projections engageable in conformable recesses in the inner periphery of a rim and also having clamps whereby to detachably engage the side edges of the rim and thus immovably support the members in position, and adjustable connections between, and hinged to, the said clamping members substantially as and for the purpose set forth.

MOSES MILTON HERMAN.

Witnesses:
J. A. HERMAN,
STANLEY HERMAN.